(12) United States Patent
Kjerrumgaard

(10) Patent No.: US 7,439,445 B2
(45) Date of Patent: Oct. 21, 2008

(54) CEILING FITTING OR COVER

(75) Inventor: Vibeke Kjerrumgaard, Hornbaek (DK)

(73) Assignee: BK Kobenhavn Holding A/S, Holte (DK)

( * ) Notice: Subject to any disclaimer, the term of this patent is extended or adjusted under 35 U.S.C. 154(b) by 0 days.

(21) Appl. No.: 10/593,965

(22) PCT Filed: Mar. 21, 2005

(86) PCT No.: PCT/IB2005/000719

§ 371 (c)(1),
(2), (4) Date: Jun. 18, 2007

(87) PCT Pub. No.: WO2005/093320

PCT Pub. Date: Oct. 6, 2005

(65) Prior Publication Data

US 2007/0261875 A1 Nov. 15, 2007

(30) Foreign Application Priority Data

Mar. 23, 2004 (EP) .................................. 04388025

(51) Int. Cl.
*H02G 15/02* (2006.01)
(52) U.S. Cl. .................................................. 174/74 R
(58) Field of Classification Search .............. 174/74 R, 174/79, 135, 136
See application file for complete search history.

(56) References Cited

U.S. PATENT DOCUMENTS

| 1,517,846 | A | * | 12/1924 | Lewis ........................ 52/302.5 |
| 3,926,141 | A | * | 12/1975 | Taylor ........................ 116/209 |
| 4,808,774 | A | * | 2/1989 | Crane ........................ 174/135 |
| 6,034,328 | A | * | 3/2000 | Kjerrumgaard ........... 174/74 R |
| 6,317,054 | B1 | | 11/2001 | Gronstedt et al. |

FOREIGN PATENT DOCUMENTS

| DE | 1750086 U | 8/1957 |
| DE | 1751205 U | 8/1957 |
| GB | 2290900 A | 1/1996 |
| WO | WO 97/01063 A | 1/1997 |

* cited by examiner

*Primary Examiner*—William H Mayo, III
(74) *Attorney, Agent, or Firm*—Klein, O'Neill & Singh, LLP

(57) ABSTRACT

A ceiling fitting or cover for covering a connection of an electrical cord to a ceiling surface includes a hollow body having upper and lower circumferential edges. The body has an over-all configuration tapering from the upper to the lower edge, with an inner surface facing an inner space defined within the body. The lower edge defines an aperture into the inner space. A plurality of elastically bendable elongated members, each having a length exceeding the width of the aperture and each having a proximal end and a distal end, is disposed in the body. The proximal ends of the elongated members are located at the inner surface of the body above the aperture, and the elongated members are orientated pointing to the aperture, the distal ends of the elongated members defining a free opening therebetween having a width less than the aperture width.

14 Claims, 1 Drawing Sheet

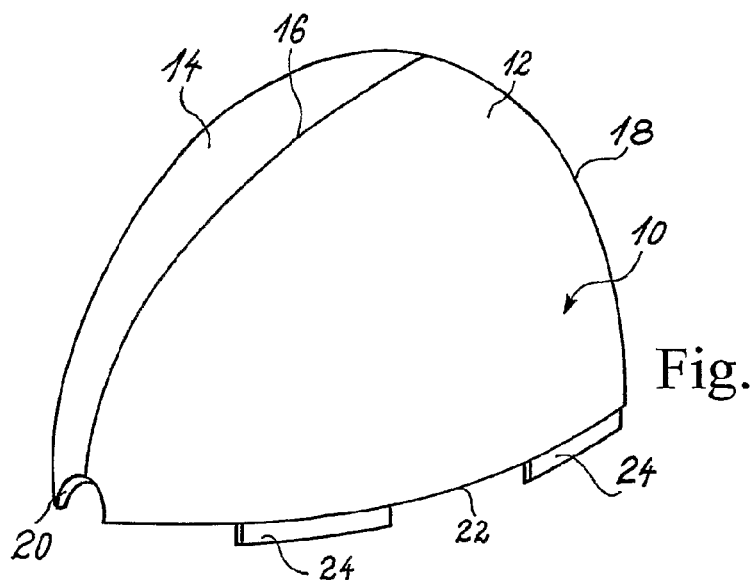
Fig. 1
Fig. 2
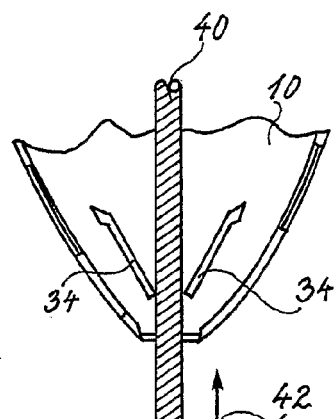
Fig. 3a
Fig. 3b
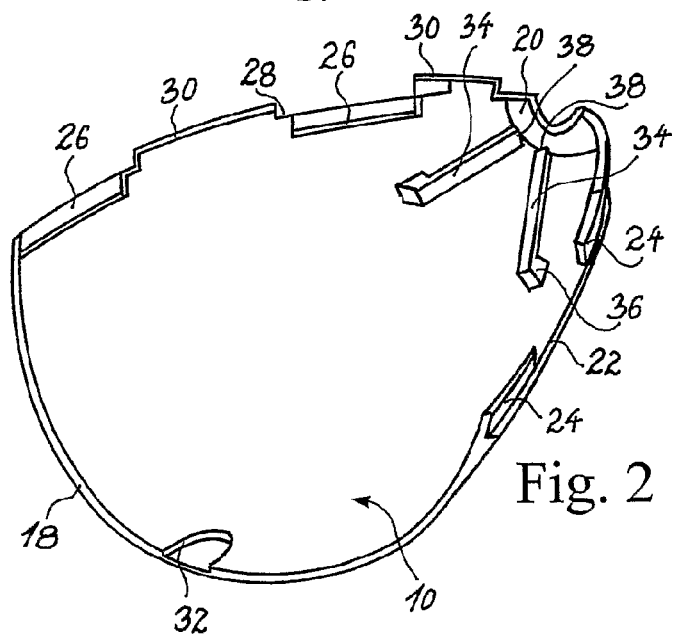
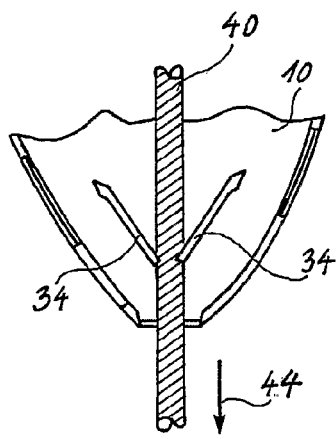
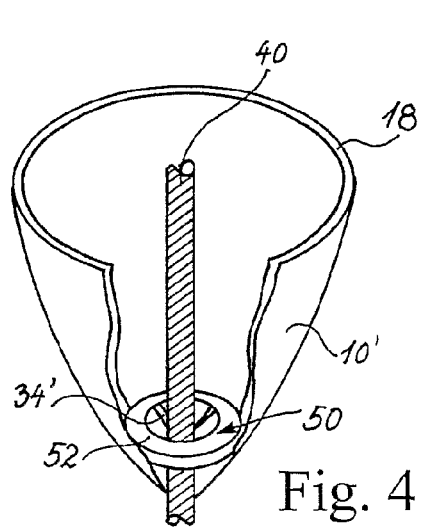
Fig. 4
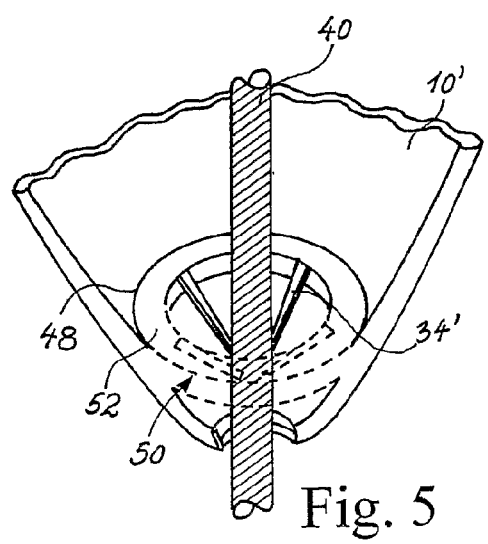
Fig. 5

CEILING FITTING OR COVER

CROSS-REFERENCE TO RELATED APPLICATION

This application is a national phase filing, under 35 U.S.C. §371(c), of International Application No. PCT/IB2005/000719, filed Mar. 21, 2005, the disclosure of which is incorporated herein by reference in its entirety.

FEDERALLY SPONSORED RESEARCH OR DEVELOPMENT

Not Applicable

BACKGROUND OF THE INVENTION

The present invention relates generally to the technical field of accessories for electrical appliances, in particular a ceiling fitting or cover for use in combination with an electric lamp or electrical appliance hanging in an electrical cord or cable from the ceiling which ceiling fitting or cover is used for covering the fixture of the cord or cable to the ceiling and/or for covering a connection to a ceiling outlet or to an extension cable or cord.

In private homes, office buildings, factories, production plants, etc. a number of electrical appliances and lamps are used hanging from the ceiling of the building or house in question. Examples of lamps hanging from the ceiling are swinging lamps and spot lamps, and examples of appliances are displaying devices, display or television monitors, fan blowers (ventilators), heaters, loudspeakers, etc. The above list of application sites, such as houses, buildings, etc. and the above list of electrical appliances are by no means to be considered complete and application of an electrical appliance used in a hanging mode hanging from a ceiling or other fixation surface is to be construed comprised in the above list. Furthermore it is to be understood that the terms used in the present context referring to the orientation of the ceiling fitting or cover is to be understood in the meaning of the intended use of the ceiling fitting as the ceiling fitting is used hanging from a ceiling, normally a substantially horizontal ceiling and the terms "up" and "down", "upper" and "lower" etc. are to be considered in the context of the above referred intentional application of the ceiling fitting or cover.

In particular in connection with swinging lamps which are suspended in an electrical wire or cord, which is fixed to the ceiling surface, e.g. to an AC power outlet or to a suspension hook or similar suspension element, it is customary to use a ceiling fitting for covering the electrical installation such as the AC power outlet or the suspension hook or similar element. A number of ceiling fittings are known from e.g. SE patents 200 070 and 388 025, published DE patent applications 2 159 985 and 2 932 334, GB patents 202 056 A and 225 1983 A, and WO 96/21123, corresponding to European patent EP 0 801 171, and U.S. Pat. Nos. 6,034,328, 6,521,836, 1,517,846, 3,926,141, 4,422,478, 4,453,353, 4,808,774, 5,029,704 and 5,153,383. Reference is made to the above-mentioned patent applications and patents, and the above US patents are hereby incorporated in the present specification by reference.

A common drawback of the prior art fittings relates to the proper and safe fixation of a ceiling fitting or cover to the electrical cord or cable, and consequently a safe and reliable positioning and fixture of the ceiling fitting or cover relative to the surface, relative to which the ceiling fitting or cover is to be manufactured in a permanent position for achieving the intentional goal of having the electrical power outlet, the suspension hook or other suspension or extension elements properly covered within the ceiling fitting or cover. Numerous references describe the use of a tight fit between the body of the ceiling fitting or cover established by the wall of the ceiling fitting or cover and/or the use of minor barbs or hooks or an elastic element such as a rubber ceiling ring for establishing the lasting and safe fixation of the ceiling fitting or cover relative to the electrical cord or cable.

Through experiments which the inventor has made in developing the technique described in the above-mentions international patent application, it has been realized that a need exists for an improved ceiling fitting or cover, in particular an improvement relating to the obtaining of a lasting and safe positioning of the ceiling fitting or cover relative to the electrical cord or cable to which the ceiling fitting or cover is mounted, and also relative to the ceiling from which the electrical cord or cable is suspended.

It has further been realized that although certain electrical outlet elements using permanent fixtures, e.g. tightening cable fixtures, may be used for the proper and safe fixation of the ceiling fitting or cover relative to the suspension cord or cable, a need exists for the provision of a ceiling fitting or cover which on the one hand allows an easy mounting without the use of any tools, and on the other hand allows a unidirectional movement of the ceiling fitting or cover from a lowered position to the raised position in the intentional position of the ceiling fitting or cover positioned close to the ceiling and preventing any intentional or unintentional movement of the ceiling fitting or cover downwards from the intentional position and in doing so ensuring a safe and proper permanent positioning of the ceiling fitting or cover relative to the suspension cable or cord, and consequently relative to the ceiling.

SUMMARY OF THE INVENTION

An object of the present invention is to provide a ceiling fitting or cover fulfilling the above needs.

A further object of the present invention is to provide a ceiling fitting or cover fulfilling the above needs and allowing the proper mounting of the ceiling fitting or cover by moving the ceiling fitting or cover upwards relative to the suspension cable or cord without the need of using any tools for obtaining the proper positioning of the ceiling fitting or cover relative to the suspension cable or cord and consequently relative to the ceiling.

It is a particular feature of the present invention that the ceiling fitting or cover according to the present invention may accommodate cables or cords of different thicknesses and type, e.g. a cable having a diameter within a fairly broad diameter interval.

It is a further object of the present invention to provide a ceiling fitting or cover which may be made from lightweight plastics materials and may be manufactured as a unitary structure or as a structure combinable from a minor number of components such as to ceiling fitting parts or a body and a fixation element.

The above objects together with other objects, features and advantages which will be evident from the below detailed description of advantageous and preferred embodiments of the ceiling fitting or cover according to the present invention are according to the teachings of the present invention obtained by a ceiling fitting or cover for covering a connection of a single electrical cord to a ceiling surface and for fixating the ceiling fitting or cover to the electrical cord, the fitting comprising a hollow body having an upper circumferential edge and a lower circumferential edge and having an overall configuration tapering from the upper circumferential edge to the lower circumferential edge, the hollow body having an inner surface facing the inner space defined within the hollow body, the lower circumferential edge defining an aperture into the inner space, and a plurality of elastically bendable elongated members, each having a length exceeding the width of the aperture and each having a proximal end and a distal end, the proximal ends of the elastically bendable elongated members being located at the inner surface of the hollow body above the aperture, the plurality of elastically bendable elongated members being orientated pointing to the aperture and the distal ends of the plurality of elastically bendable elongated members defining therebetween a free opening being smaller than the aperture.

According to the teachings of the present invention, a plurality of elastically bendable elongated members such as three, four, five or six elastically bendable elongated members are used, which members are positioned above the aperture of the hollow body of the ceiling fitting through which aperture the electrical cord or cable is received and pointing towards the aperture, preferably in an acute angle or at least an angle less than 90°, such as an angle less than 80°, preferably less than 60°, for obtaining the feature of allowing the ceiling fitting or cover to be moved upwards. When the ceiling fitting or cover is moved along the suspension cable or cord upwards, the elastically bendable elongated members are bent outwards and slide along the outer surface of the electrical cord or cable. Provided it is attempted to move or slide the ceiling fitting or cover downwards along the electrical cord or cable, the elastically bendable elongated members function as barbs which press firmly against or even cut into the outer surface of the electrical cord or cable thus preventing the sliding or movement of the ceiling fitting or cover downwards from the ceiling sliding along the suspension cable or cord.

According to two alternative and advantageous embodiments of the ceiling fitting or cover according to the present invention, the elastically bendable elongated members are integrally connected to the hollow body, or alternatively the elastically bendable elongated members are integrally connected to a separate annular body to be received within said inner space of said hollow body and preferably snapfitted into engagement with said inner surface.

For obtaining the proper and safe fixation of the ceiling fitting or cover relative to the suspension cable or cord for properly and safely positioning the ceiling fitting or cover closely adjacent to the ceiling from which the electrical cord or cable is suspended, the barb-like functioning elastically bendable elongated members preferably reduce the free opening between the ends of the elastically bendable elongated members as compared to the opening of the aperture of the hollow body. In greater details, the free opening defined by the bendable elongated members define a minimum width which is preferably less than 90%, such as less than 80%, e.g. less than 70%, preferably less than 60%, such as constituting 50%-90%, 60%-80%, preferably approximately 70% of the width of said aperture in order to obtain a tight fit between the elastically bendable elongated members serving the function of barbs or similar arresting elements and the suspension cable or cord. It is to be understood that the above percentages depend on the elasticity of the bendable elongated members and also the length of the elongated members and further provided a large size aperture of the hollow body is provided for aesthetic purposes, the above percentage may be even lower than the above limit of 50%.

For obtaining the function characteristic of the present invention of having the elastically bendable elongated members serving as barbs, the elastically bendable elongated members preferably have a length constituting at least 2 times, preferably 2-5 times, such as 2-3 times the width of the aperture in order to have the fairly long elastically bendable elongated members serving as the arresting barbs and for using the flexibility and elasticity of the material of the elastically bendable elongated members in obtaining the arresting function characteristic of the present invention. Also the fairly large length of the bendable elongated members serve to obtain the purpose of having the elastically bendable elongated members positioned above the aperture pointing towards the aperture and generating an angle as defined above less than 90°, preferably an acute angle or an angle of approximately 45° relative to the axis of symmetry of the hollow body in order to obtain the above described unidirectional motion feature of the characteristic of the present invention.

The elastically bendable elongated members are in according with the teachings of the present invention located above the aperture and further located a distance above the aperture equal to or slightly larger than the length of the members, such as a distance equal to 100%-200%, such as 100%-150%, e.g. 100%-110%, 110%-120%, 120%-130%, 130%-140%, 140%-150%, 150%-160%, 160%-170%, 170%-180%, 180%-190%, 190%-200% of said length.

The above geometrical relationships between the length of the elastically bendable elongated members, the distance of positioning the location of the elastically bendable elongated members above the aperture and also the length of the elastically bendable elongated members themselves all serve the purpose of obtaining the intended orientation and the proper functioning of the elastically bendable elongated members as described above of having the elongated members pointing in preferably and advantageously an acute angle relative to the axis of symmetry of the hollow body of the ceiling fitting or cover according to the present invention. It is to be realized that the axis of symmetry in most instances coincides or coextends with the axis of the cable or cord to which the ceiling fitting or cover is fixed.

Dependent on the overall size of the ceiling fitting, the distance at which the elastically bendable elongated members are to be located above the aperture may vary from at least 10% to e.g. 50% and the distance, consequently, preferably constitutes at least 10%, such as 10%-20%, 20%-30%, 30%-40%, 40%-50% or approximately 20%-40% of the overall height of said ceiling fitting.

The ceiling fitting or cover may, as stated above, have the elastically bendable elongated members integrally connected to the hollow body in an integral structure, and furthermore the ceiling fitting may, according to one embodiment, be unitarily molded in an integral structure. According to a highly advantageous and preferred embodiment of the ceiling fitting according to the present invention which allows an easy molding or casting of the ceiling fitting or cover, the hollow body is composed of two or more, preferably two identical parts which are easily snapfitted together by means of co-operating latching or arresting elements for generating the hollow body. In this context, reference is made to the inventor's above-mentioned published international patent application WO 96/21123, in which the feature of providing an openable or two part ceiling fitting or cover is described in greater details.

The ceiling fitting or cover according to the present invention may, as stated above, advantageously and preferably be made from plastic materials such as injection moldable plastic materials, such as polymer materials such as PE, PP, POM, ABS or combinations thereof. The injection molding technique used for the manufacture of the ceiling fitting or cover according to the present invention, irrespective of whether the hollow body be made as a single structure or a two or multi-part structure or independent of whether or not the elastically bendable elongated members are integrated into the hollow body or constitute components supported by the above described annular body, may be implemented by injection molding the elements or components of the ceiling fitting or cover from the same material or in a co-injection molding process from different materials.

If the ceiling fitting or cover is made or composed of a hollow body and a separate annular body supporting the elastically bendable elongated members, the use of different material properties for the hollow body and the elastically bendable elongated members is easily obtained, as the hollow body may be made from one material, such as a fairly hard and stiff plastic material or a metal material, e.g. aluminum, and the elastically bendable elongated members, being made as a separate component supported by the annular body as described above, may be made from a softer and more flexible or elastic material. Examples of materials relevant for the manufacture of the hollow body and the annular body, respectively, are PE, PP, POM, ABS, aluminum or stainless steel and PE, PP, POM and ABS, respectively.

BRIEF DESCRIPTION OF THE DRAWINGS

The present invention is now to be further described with reference to the drawings in which FIG. 1 is an overall perspective and schematic view illustrating a first and presently preferred embodiment of a fitting part constituting one half of a fitting and intended to be assembled with an identical second fitting part, and disclosing the outer surface of the fitting part, FIG. 2 is an overall perspective and schematic view similar to the view of FIG. 1, disclosing the interior of the fitting part, FIGS. 3a and 3b are schematic and partly cutaway views illustrating an arresting feature of the first embodiment of the fitting when composed of two fitting parts as illustrated in FIGS. 1 and 2, FIG. 4 is an overall perspective, schematic and partly cut-away view of a second embodiment of a fitting according to the present invention comprising an integral outer body or shell and an inner arresting ring, and FIG. 5 is a perspective, schematic and partly cutaway view illustrating in greater details the arresting ring of the second embodiment according to the present invention shown in FIG. 4.

DETAILED DESCRIPTION OF THE INVENTION

In FIGS. 1 and 2, a fitting part 10 is shown, which component constitutes one half of an assembled fitting constituting a first embodiment of a fitting according to the present invention. In FIG. 1, the outer surface of the fitting part 10 is disclosed, and in FIG. 2, the interior of the fitting part 10 is disclosed. Basically, the fitting part 10 is a curved shell divided into two sections 12 and 14 by an ornamental line 16 which line serves the purpose of dividing the outer basically conical surface of the assembled fitting into a total of four identical surface parts which surface parts such as the surface parts 12 and 14 are separated from the adjacent surface part by an edge of the fitting part 10 and the separation line 16.

The fitting part 10 defines a semicircular top edge 18 and a bottom semicircular edge 20. The top edge 18 has a dimension allowing the assembled fitting composed of two identical fitting parts 10 to enclose a cable and/or connector, etc. within the inner space defined within the interior of the assembled fitting when assembled from two identical fitting parts 10.

The diameter of the lower semicircular edge 20 allows an electric cord or electric cable to be introduced through the aperture defined by the two fitting parts when assembled into a composite fitting having a bottom aperture defined by the two semicircular edges 20 of the two fitting parts. It is to be understood that the bottom aperture defined by the two semicircular edges 20 of the two fitting parts 10, from which the composite fitting is assembled, is substantially larger than the outer diameter of the electric cable or cord for allowing the cable or cord to be easily introduced into the bottom aperture of the assembly fitting.

In FIG. 1, the one edge interconnecting the top edge 18 and the bottom edge 20 is designated the reference numeral 22 and as illustrated in FIG. 2, the edge 22 is provided with two inner arresting flanges 24 serving to fit into and rest in a pair of inner surface recesses 26 provided at the opposite edge 28 of the fitting part 10. As is illustrated in FIG. 2, the opposite edge 28 is further provided with two additional flanges 30, serving the purpose of fitting into and resting within corresponding recesses at the inner surface at the edge 22.

In FIG. 2, a weakening line 32 is provided at the upper edge 18 of the fitting part 20 which weakening line serves the purpose of providing a generator for an aperture which is made when the flap within the weakening line is broken away.

A particular feature of the fitting assembled from two fitting parts 10 relates to the safe and reliable fixation of the fitting composed of two fitting parts relative to the electric cable or cord, the distal end of which is connected to an electrical lamp or similar appliance, and the proximal end of which is hidden within the inner chamber defined within the fitting as the proximal end is connected to the permanent installation of the room or to an extension cable or cord, guided from the fitting through the aperture produced from the weakening line 32.

The safe and reliable fixation of the fitting is established by means of a plurality of elongated and flexible arresting arms two of which are shown in FIG. 2 and designated the reference numeral 34. The arms 34 are mounted on posts 36 for positioning the arms in an acute angle relative to the cable or cord which is guided through the bottom aperture defined by the two semicircular bottom edges 20 of the two fitting parts 10. The outer ends 38 of the arms 34 are sharp as the arms have their outer inner faces inclined relative to the longitudinal axis of the arms 34. A particular feature of the arms 34 relate to the fact that the arms are orientated extending from the posts 36 towards the bottom edge 20 for allowing the assembled fitting as is illustrated in FIG. 3a to slide along a cable or cord 40, when the assembled fitting is pushed upwards as indicated by an arrow 42 as the arms 34 easily flex or bend outwards. Provided it is attempted to move the fitting downwards relative to the cable or cord 40 as indicated in FIG. 3b and designated by an arrow 44, the flexible arms 34 function as barbs and press against or cut into the outer surface of the cable or cord and prevent the fitting from being intentionally or unintentionally moved downwards.

The barb-like arms 34 have, as is illustrated in FIG. 2, a fairly large major dimension or length as compared to the diameter of the cable or cord to which the barb functioning arms are to arrest and the fairly large length serves the purpose of positioning the arms in an acute angle relative to the cable or cord and at the same time provide the relevant flexibility of the arms for obtaining the intentional function like arresting barbs.

The first and presently preferred embodiment of the fitting according to the present invention described above with reference to FIGS. 1, 2, 3a and 3b and being implemented as a two part structure may be modified in numerous ways, e.g. in accordance with the techniques described in inventor's previously published international patent application WO 96/21123 to which reference is made, and which specification is to be considered part of the present specification. According to an alternative embodiment of the fitting according to the present invention, the outer shell of the fitting is constituted by an integral unitary structure as is illustrated in FIG. 4 in which the shell is designated the reference numeral 10'. In the below description, the components or elements identical to components or elements, respectively, described above, are designated the same reference numerals whereas components or elements serving the same purpose as components or elements, respectively, previously described, however, geometrically differing from the previously described components or elements, respectively, are designated the same reference numerals, however added a marking identifying the geometrical difference.

Whereas in the embodiment described above with reference to FIGS. 1, 2, 3a and 3b, the flexible barb-like arresting arms 34 characteristic of the present invention, are integrally included in the fitting part 10, the barb-like arresting arms of the embodiment shown in FIG. 4 are included in a separate component 50 which is snapfitted into the interior of the shell 10'. The component 50 is produced in a separate molding process and includes a ring-shaped body 52 from which a total of four arms 34' extend downwards serving the same purpose as the arm 34 described above with reference to FIGS. 3a and 3b.

In FIG. 5, the ring-shaped body 50 is shown in greater details illustrating the angular orientation of the arms 34' and further the snapfitting of the ring-shaped body 50 to the inner surface of the fitting 10' behind a circumferential rim 48 at the inner surface of the shell 10'.

It is to be understood that the structure described above with reference to FIGS. 1, 2, 3a and 3b may be modified by the introduction of a separate arresting ring similar to the ring 50, and similarly, the integral arresting arms 34 described above with reference to the first embodiment shown in FIGS. 1 and 2 may be integrated into the unitary structure embodiment 10' shown in FIGS. 4 and 5. However, it is to be understood that the integration of the arms 34 into the embodiment shown in FIG. 4 may cause severe problems in the molding process and may necessitate the use of a highly advanced and elaborated injection molding tube.

Therefore, the use of a separate arresting ring such as the ring 50 shown in FIG. 4 may be advantageous from the point of view of simplicity of manufacturing the fitting.

Furthermore, the use of a separate arresting component rather than integral arresting arms allows the outer shell body 10' to be made from one material such as a fairly stiff and solid material, whereas the arresting ring may be made from a softer and more flexible material ensuring and fulfilling the requirements as to flexibility of the arresting arms. Relevant materials for the fitting and components such as the arresting ring 50 of the fitting are plastic materials such as polyethylene (PE), polypropylene (PP), polyoxymethylene (POM) and acrylonitrile butadiene styrene (ABS). If a separate arresting ring such as the ring 50 shown in FIGS. 4 and 5 is used the outer conical shell may even be made from metal or metalized polymer such as copper or aluminum or copper- or aluminum plated plastic materials.

Although the present invention has been described above with reference to two specific and presently preferred and advantageous embodiments, numerous modifications and alterations are deducible in accordance with the teachings of the present invention as will be evident to a person having ordinary skill in the art and such variations and alterations are consequently to be considered part of the present invention as defined in the appending claims.

The invention claimed is:

1. A ceiling fitting for covering a connection of an electrical cord to a ceiling surface and for fixing said ceiling fitting to said electrical cord, said fitting comprising a hollow body having an upper circumferential edge and a lower circumferential edge and having an overall configuration tapering from said upper circumferential edge to said lower circumferential edge, said hollow body having an inner surface facing an inner space defined within said hollow body, said lower circumferential edge defining an aperture into said inner space; and a plurality of elastically bendable elongated members, each having a proximal end and a distal end and a length exceeding the width of said aperture, the proximal ends of said elastically bendable elongated members being located at said inner surface of said hollow body above said aperture, and said plurality of elastically bendable elongated members being orientated pointing to said aperture and said distal ends of said plurality of elastically bendable elongated members defining a free opening therebetween having a width less than the width of said aperture.

2. The ceiling fitting according to claim 1, said hollow body being a symmetrical body having a central axis of symmetry and each of said elastically bendable elongated members defining an acute angle relative to said axis of symmetry.

3. The ceiling fitting according to claim 1, said elastically bendable elongated members being integrally connected to said hollow body.

4. The ceiling fitting according to claim 1, said plurality of elastically bendable elongated members being integrally connected to a separate annular body to be received within said inner space of said hollow body.

5. The ceiling fitting according to claim 4, said annular body and said hollow body being made from different materials.

6. The ceiling fitting according to claim 5, said hollow body being made from a material selected from the group consisting of at least one of polyethylene (PE), polypropylene (PP), polyoxymethylene (POM), acrylonitrile butadiene styrene (ABS), aluminum and stainless steel, and said annular body being made from a polymer material selected from the group consisting of at least one of PE, PP, POM, ABS and being more elastic than the material of said hollow body.

7. The ceiling fitting according to claim 4, wherein said annular body and said hollow body are made from the same material.

8. The ceiling fitting according to claim 1, said free opening defining a minimum width, said minimum width constituting less than 90%, of the width of said aperture.

9. The ceiling fitting according to claim 1, said elastically bendable elongated members having a length constituting at least 2 times the width of said aperture.

10. The ceiling fitting according to claim 1, said elastically bendable elongated members being located at a distance above said aperture equal to or slightly larger than the length of said members.

11. The ceiling fitting according to claim 10, said distance constituting at least 10% of the overall height of said ceiling fitting.

12. The ceiling fitting according to claim 1, said hollow body constituting a unitary hollow body.

13. The ceiling fitting according to claim 1, said hollow body and said elongated members being made by injection molding from polymer materials selected from the group consisting of polyethylene (PE), polypropylene (PP), polyoxymethylene (POM), acrylonitrile butadiene styrene (ABS) and combinations thereof.

14. The ceiling fitting according to claim 1, wherein the hollow body comprises two or more hollow body parts fixed together by cooperating latching elements.

* * * * *